(12) United States Patent
Kumula et al.

(10) Patent No.: US 8,463,451 B2
(45) Date of Patent: Jun. 11, 2013

(54) AUTOMATIC PRIMARY FREQUENCY RESPONSE CONTRIBUTION MONITORING SYSTEM AND METHOD

(75) Inventors: Mario Joao Kumula, Houston, TX (US); Adnan Fareed Zafar, Houston, TX (US)

(73) Assignee: General Electric Company, Schenectady, NY (US)

( * ) Notice: Subject to any disclaimer, the term of this patent is extended or adjusted under 35 U.S.C. 154(b) by 405 days.

(21) Appl. No.: 12/763,119

(22) Filed: Apr. 19, 2010

(65) Prior Publication Data
US 2011/0257801 A1    Oct. 20, 2011

(51) Int. Cl.
*G05D 17/00* (2006.01)
(52) U.S. Cl.
USPC .......................................... 700/294; 700/287
(58) Field of Classification Search
USPC .................. 700/287, 289, 290, 292, 293, 294
See application file for complete search history.

(56) References Cited

U.S. PATENT DOCUMENTS

| | | | |
|---|---|---|---|
| 6,118,187 A | 9/2000 | Hepner et al. | |
| 6,609,361 B2 | 8/2003 | Vugdelija | |
| 7,233,843 B2 | 6/2007 | Budhraja et al. | |
| 7,608,938 B2 | 10/2009 | Andrew et al. | |
| 2004/0260430 A1* | 12/2004 | Mansingh et al. | 700/286 |
| 2006/0041405 A1* | 2/2006 | Chen et al. | 703/2 |
| 2007/0132249 A1 | 6/2007 | Andrew et al. | |
| 2011/0278853 A1* | 11/2011 | Capp et al. | 290/1 A |

FOREIGN PATENT DOCUMENTS

| | | |
|---|---|---|
| EP | 0858153 B1 | 4/2003 |
| EP | 1275822 A3 | 11/2003 |
| EP | 1914394 A1 | 4/2008 |

OTHER PUBLICATIONS

Chown, G.A., Coetzee, M.G. "Implementation of Regulation as an Ancillary Service in Eksom and the use of Eksom Internal Web for this service". IEEE Transaction on Power Systems 15.3 (Aug. 2000): 1132-1136.*
U.S. Appl. No. 12/562,064, filed Sep. 17, 2009, Prochaska et al.

* cited by examiner

*Primary Examiner* — Ryan Jarrett
(74) *Attorney, Agent, or Firm* — Fletcher Yoder P.C.

(57) ABSTRACT

Systems and methods for monitoring power generation are provided. For example, such a system may include a gas turbine, an electrical generator coupled to the drive, a controller coupled to the gas turbine, and a compliance monitor. The gas turbine may generate a torque, and the electrical generator may provide power to a power grid based on the torque. The controller may cause the gas turbine to vary the torque in response to a frequency disturbance occurring on the power grid. The compliance monitor may determine whether the response to the frequency disturbance complies with a specification for the response.

22 Claims, 10 Drawing Sheets

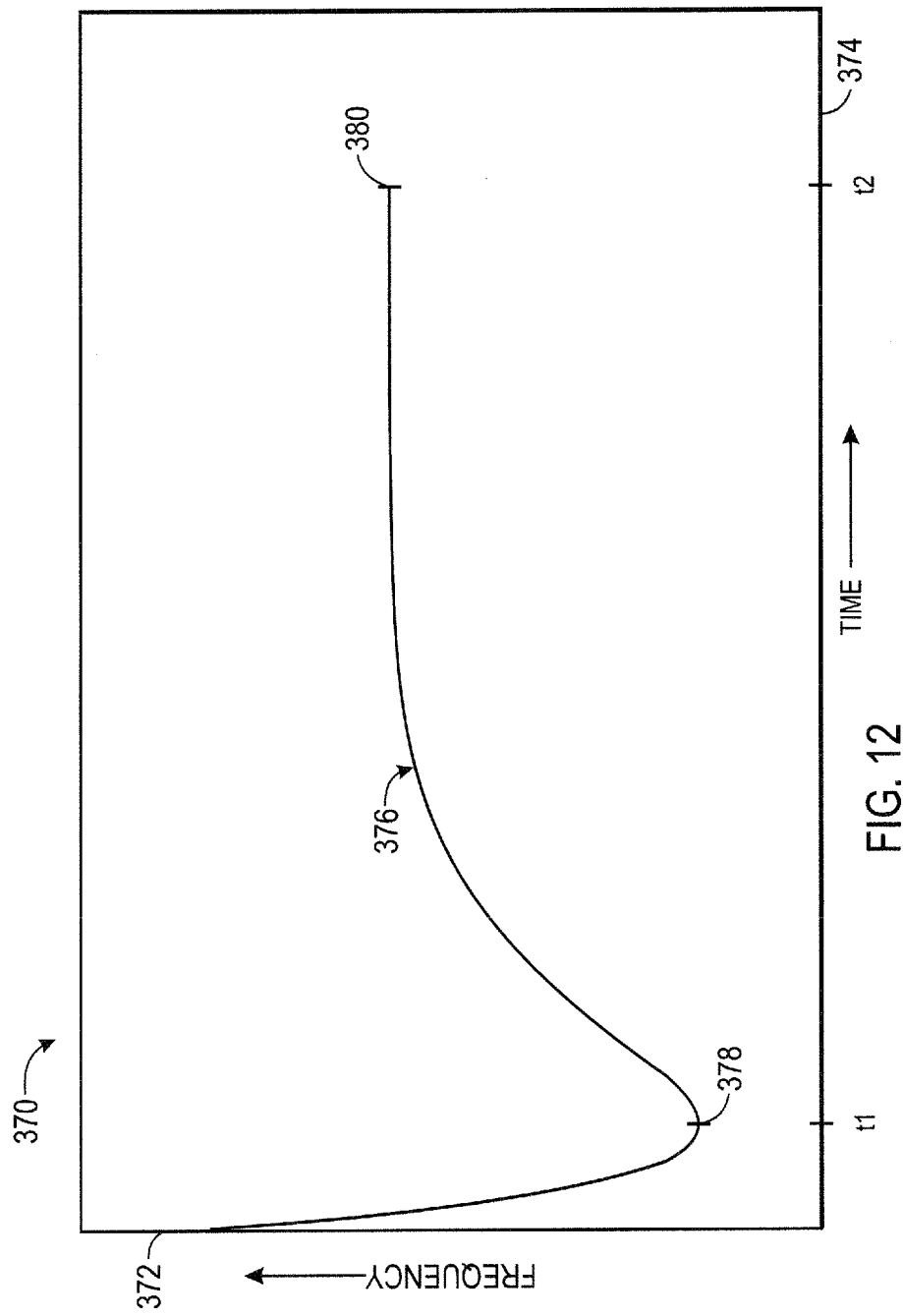

AUTOMATIC PRIMARY FREQUENCY RESPONSE CONTRIBUTION MONITORING SYSTEM AND METHOD

BACKGROUND OF THE INVENTION

The subject matter disclosed herein relates to a turbine generator monitoring system.

A large load change on a utility grid or within an industrial facility can cause rapid destabilization of connected generators, particularly low inertia generators. Initially, in the first several seconds, the connected generators rapidly change in speed and operating frequency in response to the load change. If the change in frequency passes a threshold known as the dead band frequency (e.g., a minimum frequency change), individual generators may perform a primary frequency response (PFR), increasing or decreasing the amount of power generated by each generator proportionally to the change in frequency. To ensure the stability of the power grid, grid operators may require the electrical generators to comply with certain specifications. For example, such a specification may require that a turbine generator provide half of a PFR output power in 15 seconds and all of the PFR output power in 30 seconds. Using conventional electrical generators, however, it may be impossible to know whether the rules or regulations are being complied with at any given time, but rather only whether the electrical generator is capable of complying with the specification.

BRIEF DESCRIPTION OF THE INVENTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a gas turbine, an electrical generator coupled to the drive, a controller coupled to the gas turbine, and a monitor. The gas turbine may generate a torque, and the electrical generator may provide power to a power grid based on the torque. The controller may cause the gas turbine to vary the torque in response to a frequency disturbance occurring on the power grid. The monitor may determine whether the response to the frequency disturbance complies with a specification for the response.

In another embodiment, a system may include an electrical generator monitor. When the electrical generator carries out a primary frequency response in response to a frequency disturbance of a power grid, the monitor may compare a contribution feedback and a contribution demand of the electrical generator to determine whether the primary frequency response of the electrical generator complies with a specification for the frequency response of the electrical generator.

In a further embodiment, a method may include initiating a primary frequency response of an electrical generator when a grid frequency disturbance occurs before determining a contribution demand of the electrical generator. The contribution demand may be determined based at least in part on a droop response of the electrical generator and an amount of the frequency disturbance. The output of the electrical generator may be measured to determine a contribution feedback, which may be compared to the contribution demand. When the contribution feedback does not comply with a specification governing a relationship between the contribution feedback and the contribution demand at a predetermined time, an indication of such may be provided.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 12 is a plot that represents an embodiment of a functional specification of a primary frequency response (PFR).

DETAILED DESCRIPTION OF THE INVENTION

Figure 1:
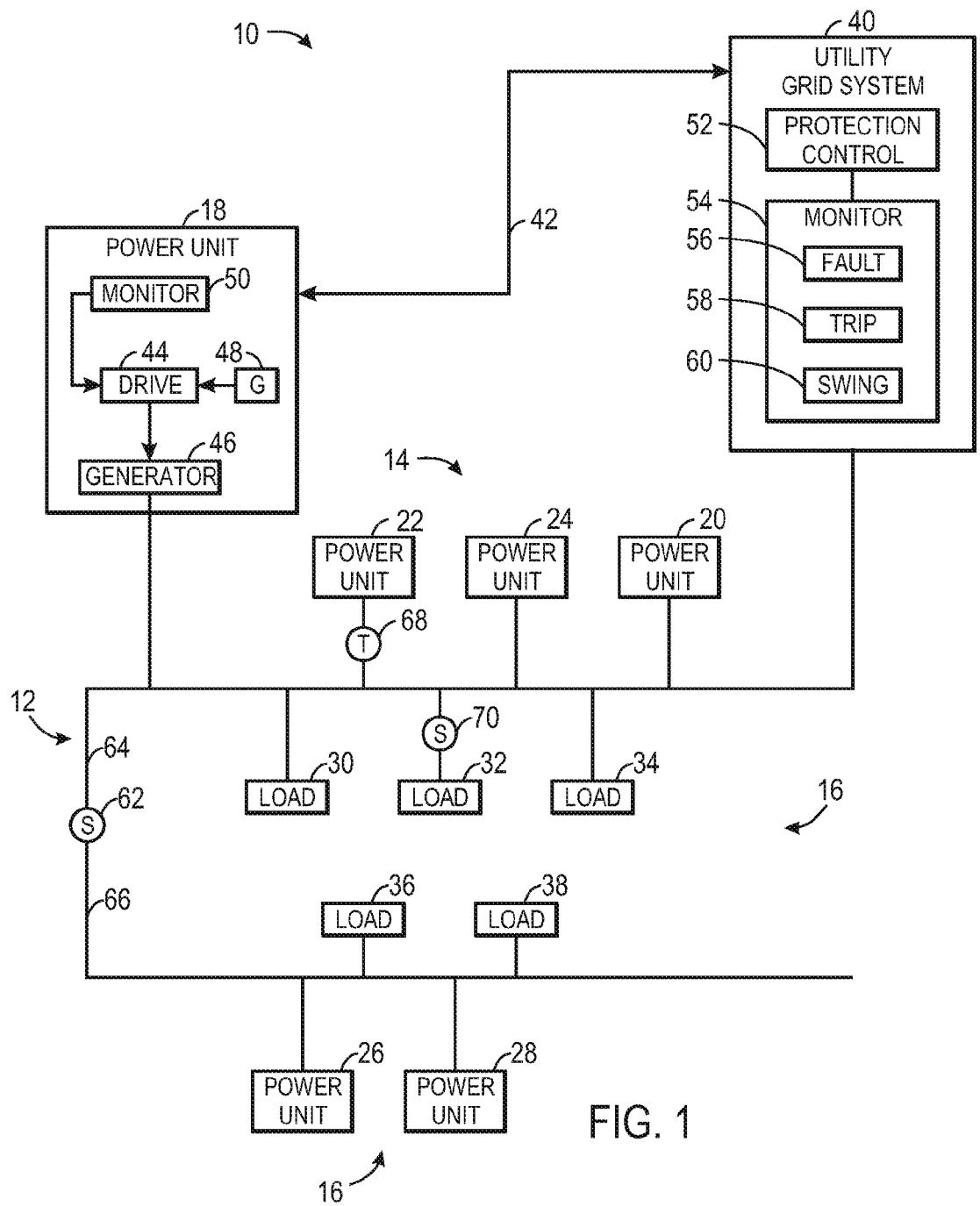
FIG. 1 is a block diagram of an embodiment of an electrical system in which a distributed power unit may include a monitor to determine whether the power unit is complying with a rule or regulation of the electrical system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Present embodiments relate to monitoring an electrical generator for compliance with a specification (e.g., a local power grid rule or regulation, a manufacturing requirement, etc.) while the electrical generator is performing a primary frequency response (PFR) to a frequency disturbance on a power grid. In particular, the embodiments disclosed below may involve monitoring for compliance with the specification in real-time (e.g., while the PFR is being carried out). These embodiments may apply particularly to monitoring the PFR of low-inertia electrical generators, such as aero-derivative turbine generators, which may be relatively susceptible to frequency disturbances on the power grid, but which also may be capable of responding to such disturbances relatively rapidly.

A primary frequency response (PFR) may be initiated by a governor of an electrical generator when a frequency disturbance occurs on the power grid, such as when load on the power grid rapidly increases or decreases on the power grid, causing the frequency of the power grid to vary from a nominal frequency (e.g., typically 50 Hz or 60 Hz). The electrical generator may experience a corresponding change in frequency. When the frequency variance exceeds a minimum threshold, known as a dead band, a governor of the electrical generator may initiate the PFR to attempt to stabilize the power grid by increasing or decreasing the output power of the generator based on a preset formula (referred to herein as "droop response").

To ensure the stability of the power grid when relatively low-inertia electrical generators perform a primary frequency response (PFR), a power grid may require that the PFR be carried out in a specific manner. By way of example, such a specification (e.g., a rule or regulation) may require that an electrical generator provide increased or decreased power output (referred to herein as "contribution feedback") equal to half of the total power contribution as required by the droop response (referred to herein as "contribution demand") within a first response time of the frequency disturbance (e.g., fifteen seconds), and may require all of the power contribution within a second response time of the frequency response (e.g., thirty seconds). Rather than merely determine whether the electrical generator is capable of complying with the specification, a monitor may assess whether the electrical generator complies with the specification in real-time (e.g., as the PFR is being carried out). In some embodiments, such real-time monitoring may involve periodically comparing the contribution demand to the contribution feedback. Based on instantaneous values or trends of these values, the monitor may issue an alarm or warning if the electrical generator is not currently in compliance with the specification, or is expected not to comply with the specification.

With the foregoing in mind, FIG. 1 is a block diagram of an embodiment of an electrical system 10, which includes a power grid 12 supplied by power units 14 configured to carry out and monitor in real-time a primary frequency response (PFR) in response to frequency-based disturbances of the power grid 12. As illustrated, the electrical system 10 includes the power grid 12 coupled to distributed power units 14 and distributed loads 16. The distributed power units 14 may include a plurality of power units 20, 22, 24, 26, and 28. Each of these distributed power units 14 is configured to generate power for distribution on the power grid 12. The distributed loads 16 may include a plurality of loads 30, 32, 34, 36, and 38. Each of these distributed loads 16 is configured to draw power from the power grid 12 to operate machinery, buildings, and other systems. The illustrated electrical system 10 also includes a utility grid system 40 coupled to the power grid 12. The utility grid system 40 may provide certain control over the power grid 12 and may detect various grid destabilizing events, such as transient stability upsets, in the power grid 12. These transient stability upsets may correspond to severe changes in frequency or loading on the power grid 12. Additionally, when such events occur, the utility grid system 40 may receive a utility signal 42 from one or more of the power units 14. The utility signal 42 may indicate whether the power unit 14 is responding to the disturbance in a manner that complies with a specification associated with the power grid 12 (e.g., a local rule or regulation). In certain embodiments, the utility signal 42 may indicate in real-time whether the response of the power unit 14 complies with the specification.

The distributed power units 14 may include a variety of power generation systems configured to distribute power onto the power grid 12. For example, such a distributed power unit 14 may include generators driven by a reciprocating combustion engine, a gas turbine engine, a steam turbine engine, a hydro-turbine, a wind turbine, and so forth. The distributed power unit 14 also may include large arrays of solar panels, fuel cells, batteries, or a combination thereof. The size of these distributed power units 14 also may vary from one unit to another. For example, one power unit 14 may have a substantially larger inertia than another power unit 14 on the power grid 12.

In the illustrated embodiment, the power unit 18 represents a relatively low inertia power unit 14, which includes a drive 44 coupled to a generator 46. The power unit 18 also includes a governor 48, which may provide a proportional-acting control of the drive 44. The drive 44 is configured to rotate the generator 46 for power generation in response to control by the governor 48 and/or other internal control features. In certain embodiments, the drive 44 may include a low rotating inertia engine, such as a gas turbine engine. For example, the drive 44 may include an aero-derivative gas turbine engine, such as an LM1600, LM2500, LM6000, or LMS100 aero-derivative gas turbine engine manufactured by General Electric Company of Schenectady, N.Y. However, the drive 44 may be any suitable mechanism for rotating the generator 46. As discussed in further detail below, the drive 44 may rapidly change in speed in response to a severe change in load on the power grid 12, thereby causing a rapid change in frequency of power output from the generator 46 onto the power grid 12.

The distributed loads 16 may include a variety of equipment and facilities on the power grid 12. For example, the distributed loads 16 may include residential homes, commercial buildings, industrial facilities, transportation systems, and individual equipment. In general, these distributed loads 16 may gradually change electrical demand over each 24 hour period. For example, peak demand may generally occur at midday, while minimum demand may generally occur at midnight. Over the course of the day, the electrical demand by these distributed loads 16 may generally increase in the morning hours, and subsequently decrease in the afternoon hours. The distributed power units 14 are generally able to respond to these gradual changes in electrical demand on the power grid 12. Unfortunately, rapid load swings on the power grid 12 may create a substantial gap between the electrical power supplied by the distributed power unit 16 and the electrical demand by the distributed loads 16. As a result, a large decrease in load may cause the power units 14 to accelerate, thereby increasing the frequency of the power grid 12. Likewise, a large increase in load may cause the power units to decelerate, thereby decreasing the frequency of the power grid 12.

As discussed in greater detail below, when such frequency-based grid disturbances occur, causing the frequency of the power grid 12 to deviate from a nominal frequency, the drive 44 may correspondingly increase or decrease in frequency. When such conditions involve frequencies that exceed a minimum threshold known as a dead band (e.g., 1 mHz, 2 mHz, 5 mHz, 10 mHz, 20 mHz, and so forth), the governor 48 may initiate a primary frequency response (PFR) intended to assist in stabilizing the power grid 12. During the PFR, the governor 48 may instruct the drive 44 to add or remove torque to the generator 46 according to a setpoint known as "droop response." Doing so may add or remove power that, collectively with other distributed power units 14, may return the frequency of the power grid 12 to its nominal frequency. In the illustrated embodiment, a compliance monitor 50 in the power unit 18 is configured to monitor in real-time whether the primary frequency response (PFR) undertaken by the governor 48 complies with a specification. The compliance monitor 50 may output, among other things, the utility signal 42 to apprise the utility grid system 40 of whether the power unit 18 is currently in compliance with the specification.

Additionally, as illustrated, the utility grid system 40 may be configured to monitor certain system-wide events. For example, the utility grid system 40 may include a protection control 52 and a grid monitor 54, which collectively provide rapid event identification and corrective actions based on various grid destabilizing events throughout the power grid 12. For example, the grid monitor 54 may include a fault monitor 56, a trip monitor 58, and a swing monitor 60. The fault monitor 56 may be configured to rapidly identify a fault, such as a transmission line fault 62, in the power grid 12. The fault 62 may represent a discontinuity in first and second portions 64 and 66 of the power grid 12. As a result, the transmission line fault 62 may disconnect loads 36 and 38 and power units 26 and 28 from the first portion 64 of the power grid 12. The trip monitor 58 may be configured to identify a trip of one or more of the distributed power units 14, such as a trip 68 of the power unit 22. As a result of the trip 68, the electrical power demand by the distributed loads 16 may suddenly exceed the available power by the distributed power units 14. The swing monitor 60 may be configured to identify rapid changes in electrical demand by one or more of the distributed loads 16, such as a swing 70 in the load 32. For example, the swing 70 may represent a sudden increase or decrease in electrical demand in certain equipment, industrial facilities, or the like.

In the disclosed embodiments, the compliance monitor 50 may be particularly useful for relatively low-inertia power units 14. Since low-inertia power units 14 may be more susceptible to load changes due to the relatively low inertia of their drives 44, low-inertia power units 14 also may be more likely to operate at lower or higher frequencies when such events occur. Owners or operators of the utility grid system 40 therefore may require such low-inertia power units 14, through a specification (e.g., a local power grid rule or regulation), to respond quickly to ameliorate such frequency changes through a primary frequency response (PFR). For example, the droop response of the governor 48 may be set by an operator of the power unit 18. During PFR, the governor 48 may increase or decrease power output by a fractional amount of the total nominal output power of the power unit 18 based on the droop response. The owners or operators of the utility grid system 40 may require via a specification that such an increase or decrease in power output must take place within a specified period of time.

Figure 11:
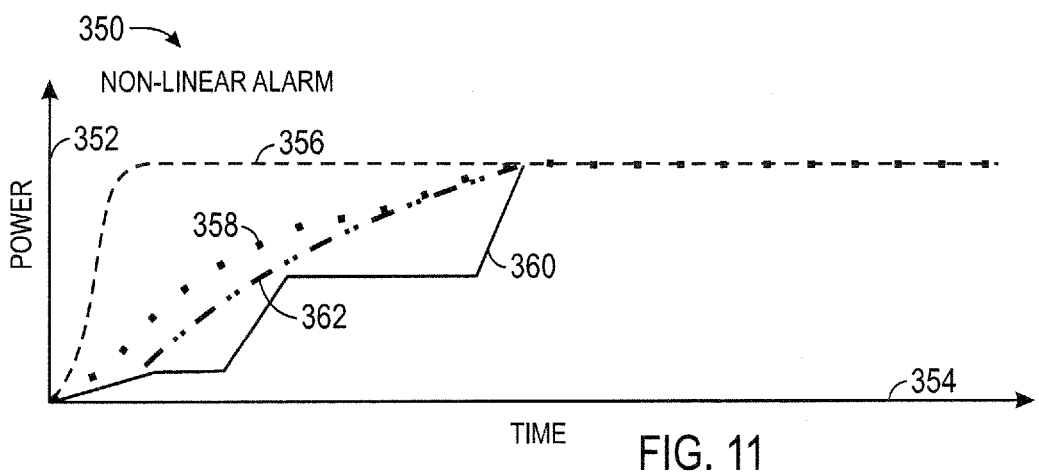

To provide one example, the specification may require that half of such an increase or decrease in power output take place within 15 seconds of a frequency disturbance, and that all of the increase or decrease in power output must take place within 30 seconds. Another specification may require that a 100% contribution be provided after a certain amount of time, which must be maintained for another period of time. For example, the specification may state that the PFR must be a 100% contribution within 30 seconds, which must be maintained for the following 5 minutes. Other specifications may involve meeting or exceeding a minimum function. For example, FIG. 12 illustrates a plot 370 that represents such a functional specification. An ordinate 372 represents a frequency of the grid 12 and an abscissa 374 represents time. A curve 376 represents a functional specification, in which the specification is defined by a particular mathematical function. In the example of FIG. 11, the specification may require that a first initial response (FIR) 378 must take place by a time t1, while a second initial response (SIR) 380 must take place by a time t2. The contribution response must meet both the FIR 378 and the SIR 380 to be considered in compliance with the specification.

Figure 2:
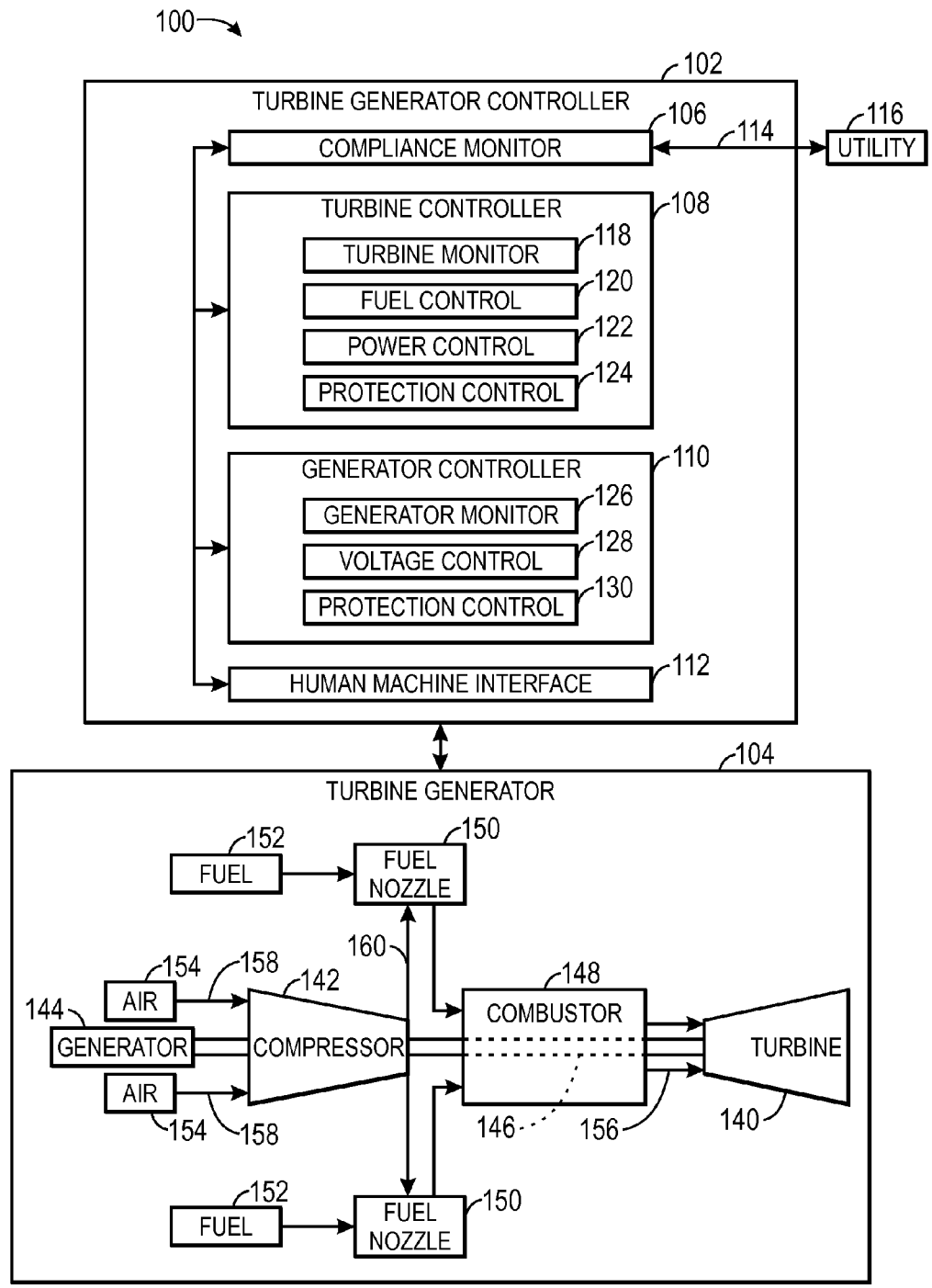
FIG. 2 is a block diagram of an embodiment of a turbine generator system including a compliance monitor.

FIG. 2 is a block diagram of an embodiment of a turbine generator system 100 having a turbine generator controller 102 coupled to a turbine generator 104. As illustrated, the turbine generated controller 102 includes a compliance monitor 106, a turbine controller 108, a generator controller 110, and a human machine interface 112. As discussed in further detail below, the compliance monitor 106 may monitor the primary frequency response (PFR) of the turbine generator 104 for compliance with a specification (e.g., a local power grid rule or regulation). Additionally, the compliance monitor 106 may output a utility signal 114, such as the utility signal 42, to a utility network 116, which may provide the utility signal 114 to the utility grid system 40 as shown in FIG. 1. The turbine controller 108 may include a variety of monitors and controls, such as a turbine monitor 118, a fuel control 120, a power control 122, and a protection control 124. The illustrated generator controller 110 also may include a variety of monitors and controls, such as a generator monitor 126, a voltage control 128, and a protection control 130. The monitors and controls of the turbine controller 108 and the generator controller 110 may be configured to monitor and control certain features of the turbine generator 104.

In the illustrated embodiment, the turbine generator 104 includes a turbine 140 coupled to a compressor 142 and an electrical generator 144 via one or more shafts 146. As appreciated, the illustrated turbine 140 may include one or more turbine stages, and the compressor 142 may include one or more compressor stages. The turbine generator 104 also includes one or more combustors 148 and fuel nozzles 150 configured to combust a mixture of fuel 152 and air 154, and deliver hot combustion gases 156 to the turbine 140. In particular, the compressor 142 is driven by the turbine 140 to compress air 154 at an upstream air intake 158, and then deliver compressed air 160 to the one or more combustors 148 and fuel nozzles 150. For example, the fuel nozzles 150 may transmit the compressed air 160 and the fuel 152 into the combustor 148 in a suitable mixture for combustion. The mixture of fuel and air then combusts within the combustor 148, thereby producing hot combustion gases 156 flowing into the turbine 140. The hot combustion gases 156 drive turbine blades within the turbine 140 to rotate the shaft 146, thereby driving both the compressor 142 and the generator 144. In certain embodiments, the turbine engine may be an aero-derivative gas turbine engine, such as an LM1600, LM2500, LM6000, or LMS100 aero-derivative gas turbine engine manufactured by General Electric Company of Schenectady, N.Y. Thus, the turbine generator 104 may be configured to generate up to approximately 14 to 100 MW, 35 to 65 MW, or 40 to 50 MW of electricity. For example, the LM2500 engine may be configured to generate up to approximately 18 to 35 MW, the LM6000 engine may be configured to generate up to approximately 40 to 50 MW, and the LMS100 engine may be configured to generate up to approximately 100 MW.

The turbine generator controller 102 provides monitoring and control of various features of the turbine generator 104. For example, the turbine monitor 118 of the turbine controller 108 may monitor rotational speed, vibration, temperature, pressure, fluid flow, noise, and other parameters of the turbine 140, the compressor 142, the combustor 148, and so forth.

The fuel control 120 of the turbine controller 108 may be configured to increase or decrease fuel flow to the one or more fuel nozzles 150, thereby changing the combustion dynamics within the combustor 148 and in turn operation of the turbine 140. For example, the fuel control 120 may reduce the fuel flow rate to the fuel nozzles 150 to reduce the combustion in the combustor 148, and therefore reduce the speed of the turbine 140. Likewise, the fuel control 120 may increase the fuel flow rate to the fuel nozzles 140 to increase the combustion in the combustor 148, and therefore increase the speed of the turbine 140. The fuel control 120 also may vary other characteristics of the fuel injection depending on the number and configuration of fuel nozzles 150. For example, the fuel control 120 may adjust multiple independent fuel lines to different fuel nozzles 150 to vary the characteristics of combustion within the combustor 148. As illustrated in FIG. 2, blocks 152 may correspond to common or independent fuel lines, manifolds, or fuel governors. In response to a grid destabilizing event, the event responsive control 106 may control various aspects of the fuel control 120.

The power control 122 of the turbine controller 108 may be configured to increase or decrease power output of the turbine 140. For example, the power control 122 may monitor and/or control various operational parameters of the compressor 142, the fuel nozzles 150, the combustor 148, the turbine 140, and external loads (e.g., the generator 144). In particular, the power control 122 may cooperate with the fuel control 120 to adjust fuel flow, thereby adjusting combustion. The power control 122 also may control flow of multiple fuels (e.g., gas and/or liquid fuels), air, water, nitrogen, or various other fluids for various reasons, including performance, emissions, and so forth. For example, the power control 122 may selectively enable a gas fuel flow, a liquid fuel flow, or both depending on various conditions and available fuel. By further example, the power control 122 may selectively enable a low BTU fuel or a high BTU fuel depending on the power requirements. Likewise, the power control 122 may selectively enable water flow, nitrogen flow, or other flows to control emissions. In response to a frequency-based grid disturbance, the turbine generator controller 102 may control various aspects of the power control 122 to adjust power output during a primary frequency response (PFR), during which time the compliance monitor 106 may assess whether the turbine generator 104 is operating in compliance with a specification (e.g., a power grid rule or regulation).

The protection control 124 of the turbine controller 108 may execute corrective actions in response to events indicative of potential damage, excessive wear, or operational thresholds. For example, if the turbine monitor 118 identifies excessive vibration, noise, or other indicators of potential damage, the protection control 124 may reduce speed or shut down the turbine generator 104 to reduce the possibility of further damage. In certain embodiments, the protection control 124 of the turbine controller 108 may include clearance control, which may provide control of clearance between rotating and stationary components, e.g., in the turbine 140 and/or the compressor 142. For example, the clearance control may increase or decrease a coolant flow through the turbine 140 or the compressor 142 to change the thermal expansion or contraction of stationary parts, thereby expanding or contracting the stationary parts (e.g., shroud segments) about the rotating blades. In this manner, the clearance control may increase or decrease the clearance between the rotating blades and the stationary parts in the turbine 140 and the compressor 142. Alternatively, the clearance control may control other clearance mechanisms within the turbine 140 or the compressor 142, such as a drive mechanism coupled to the stationary parts disposed about the rotating blades within the turbine 140 or the compressor 142.

The generator controller 110 also may have a variety of monitor controls to improve performance and reliability of the power output from the turbine generator 104. For example, the generator monitor 126 may monitor the various power characteristics of the generator 144, such as voltage, current, and frequency. The generator monitor 126 also may monitor various characteristics indicative of wear or damage, such as vibration, noise, or winding faults. The voltage control 128 may be configured to process and filter the electrical output from the generator 144, thereby providing the desired electrical output to the power grid.

The protection control 130 may be configured to take corrective actions in response to feedback from the generator monitor 126, thereby reducing the possibility of damage or excessive damage to the generator 144 or the turbine generator 104 as a whole. For example, the protection control 130 may disconnect the generator 144 from the turbine generator 104, disconnect loads from the generator 144, or shut down the turbine generator 104 in response to excessive vibration or noise identified by the generator monitor 126. The generator monitor 126, voltage control 128, and protection control 130 also may provide control scan updates to the compliance monitor 50 indicating, for example, the frequency of the turbine 140 and current power output of the turbine generator 104, from which the compliance monitor 106 may determine compliance with the specification.

The compliance monitor 106 may include a uniquely programmed computing device, such as a programmed computer system or circuit board, having monitoring instructions that are executable at least when a primary frequency response (PFR) takes place. For example, the compliance monitor 106 may carry out certain algorithms, such as those discussed below, to ascertain whether the turbine generator 104 complies with, or is likely to comply with, a certain specification.

Figure 3:
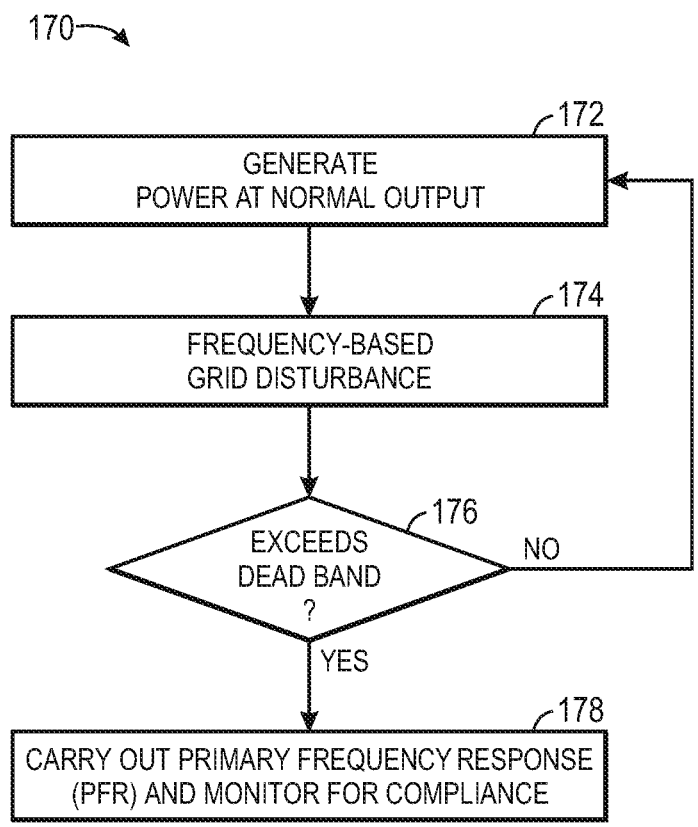
FIG. 3 is a flowchart of an embodiment of a primary frequency response (PFR) to a power grid frequency disturbance during which compliance with a specification may be monitored in real-time.

FIG. 3 depicts a flowchart 170 of an embodiment of a method for operating the power unit 18 when a frequency-based disturbance occurs on the power grid 12. The flowchart 170 may begin as the power unit 18 is generating power at a normal output power level (block 172). Such a normal output power generally may be controlled by an operator of the power unit 18, and may be less than a nominal power output of the power unit 18. Occasionally, a frequency-based grid disturbance may occur for a variety of reasons, many of which are discussed above (block 174). For example, if the distributed loads 16 on the power grid 12 rapidly increase or decrease, the frequency of the power grid 12 may correspondingly decrease or increase, and the power unit 18 may respond in kind. In particular, when a load 16 increases suddenly on the power grid 12, and the distributed power units 14 are unable to meet the rapidly increased demand immediately, the frequency of the power grid 12 may drop by a certain percentage. Correspondingly, the speed of the drive 44 of the power unit 18 also may drop by the same percentage.

The governor 48 may detect whether the frequency change exceeds a threshold dead band frequency (e.g., 1 mHz, 2 mHz, 5 mHz, 10 mHz, 20 mHz, or others) (decision block 176). If the frequency change during the grid disturbance does not exceed the dead band, the power unit 18 may continue to generate power at the normal output, generally without regard to the frequency-based grid disturbance (block 172). However, if the frequency change does exceed the dead band, the power unit 18 may begin to carry out a primary frequency response (PFR) to the grid disturbance (block 178). At the same time, the compliance monitor 50 of the power unit 18 may monitor the power unit 18 for compliance with a specification (e.g., power grid rules or regulations) pertaining to the PFR.

During the primary frequency response (PFR) in response to a frequency-based disturbance, the governor 48 may instruct the drive 44 to increase or decrease the torque to the generator 46, increasing or decreasing the power output of the power unit 18. In general, the governor 48 may perform the PFR by increasing the output power (referred to as the "contribution feedback") to match a requested power output (referred to as the "contribution demand") when the frequency disturbance causes a drop in frequency. Under such conditions, an additional amount of contribution demand, which may be added to the normal power output, may be determined according to the following relationship:

$$ContributionDMD = \frac{BaseMW}{BaseFREQ} \cdot \frac{DeltaFREQ}{DroopFBK} \cdot (-1), \quad (1)$$

where ContributionDMD represents the additional contribution demand, BaseMW represents a nominal power output of the power unit 18, BaseFREQ represents a nominal frequency of the power unit 18 and the power grid 12, DeltaFREQ represents a value of the frequency disturbance, and DroopFBK represents a droop response setpoint (a percentage value representing at what percent change in frequency to provide a value relative to nominal output power). Note that if the power unit 18 is already producing power at a normal output power, it may be impossible to output an additional full contribution according to Equation (1). Under such conditions, the total contribution demand may be limited depending on the current operating parameters of the power unit 18.

Similarly, the governor 48 may perform the PFR by decreasing the output power (referred to as the "contribution feedback") to match a requested power output (referred to as the "contribution demand") when the frequency disturbance causes an increase in frequency. Under such conditions, the additional contribution demand may be determined according to the following relationship:

$$ContributionDMD = \frac{BaseMW}{BaseFREQ} \cdot \frac{DeltaFREQ}{DroopDMD} \cdot (-1), \quad (2)$$

where ContributionDMD represents the additional contribution demand, BaseMW represents the nominal power output of the power unit 18, BaseFREQ represents the nominal frequency of the power unit 18 and the power grid 12, DeltaFREQ represents the value of the frequency disturbance, and DroopDMD represents the droop response setpoint (a percentage value representing at what percent change in frequency to provide a value relative to nominal output power). When the frequency disturbance causes an increase in frequency, the contribution demand represents a demanded reduction of power output by the power unit 18.

Figure 4:
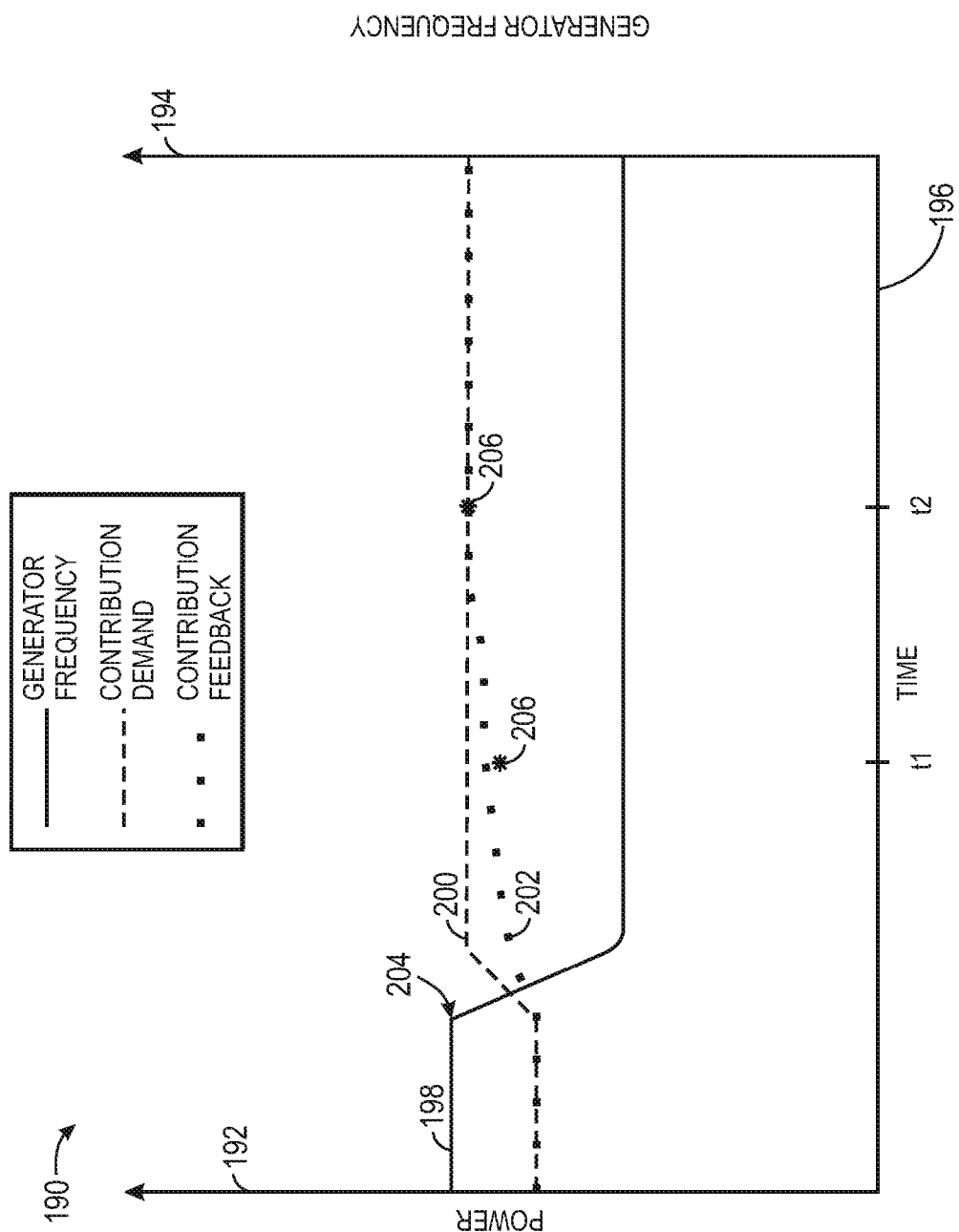
FIG. 4 is a plot modeling a primary frequency response (PFR) of an electrical generator to a power grid frequency disturbance on a power grid, in accordance with an embodiment.

FIG. 4 is a plot 190 that illustrates a manner in which the power unit 18 may carry out the primary frequency response (PFR) in response to a frequency-based grid disturbance. In particular, the plot 190 models power output by the power unit 18 (first ordinate 192), and the frequency of the power grid 12 and the power output by the power unit 18 (second ordinate 194), over time (abscissa 196). At the start of the plot 190, a curve 198, representing the frequency of the power unit 18, begins at a nominal frequency of the power grid 12. When a frequency-based grid disturbance 204 occurs, the frequency of the drive 44 may change rapidly, causing a corresponding change in the frequency of the output power.

As illustrated in the plot 190, the frequency drops by a certain percentage. The additional contribution demand may be calculated according to Equation 1, which may be added to the current contribution demand to obtain a total contribution demand. The total contribution demand is represented by a curve 200, which correspondingly increases when the frequency disturbance 204 occurs. Another curve 202, representing the contribution feedback, illustrates the manner in which the actual power output by the power unit 18 may lag the contribution demand of the curve 200. As noted above, operators or owners of the utility grid system 40 may impose a specification as to how slowly the contribution feedback may meet the contribution demand.

In the instant example, the specification may require that the contribution feedback exceed half of the additional contribution demand by a first time t1 after a frequency disturbance 204, and that the contribution feedback meet the additional contribution demand by a second time t2 after the frequency disturbance 204. These minimum requirements imposed by such a specification are noted at numerals 206 denoting compliance indicators. The compliance monitor 50 may undertake a variety of techniques to determine whether the primary frequency response (PFR) complies with the specification. These techniques may involve a variety of potential compliance alarm or warning triggers, as discussed further below.

Figure 5:
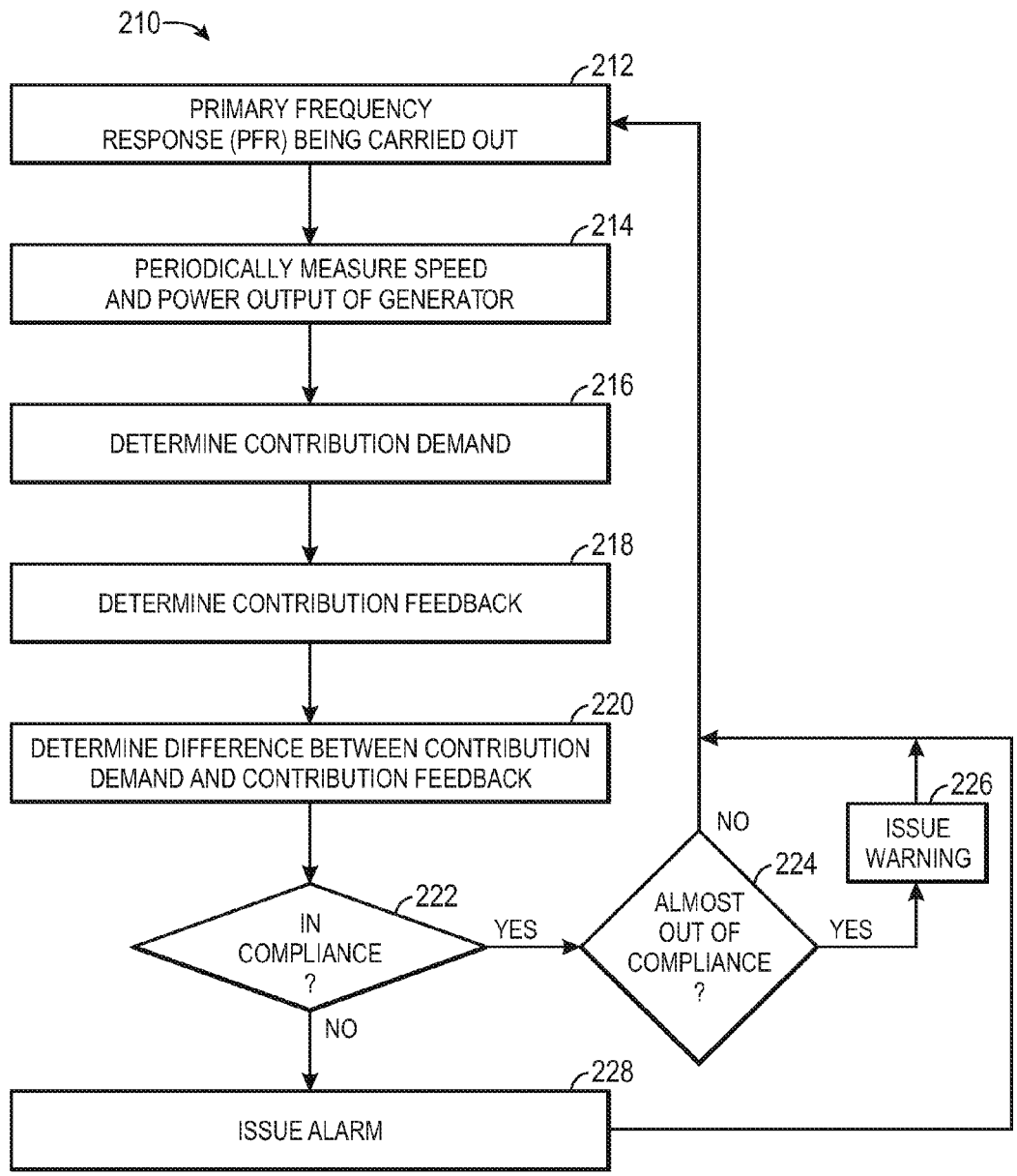
FIG. 5 is a flowchart of an embodiment of a specification compliance monitoring process during a primary frequency response (PFR) to a frequency disturbance.
Figure 6:
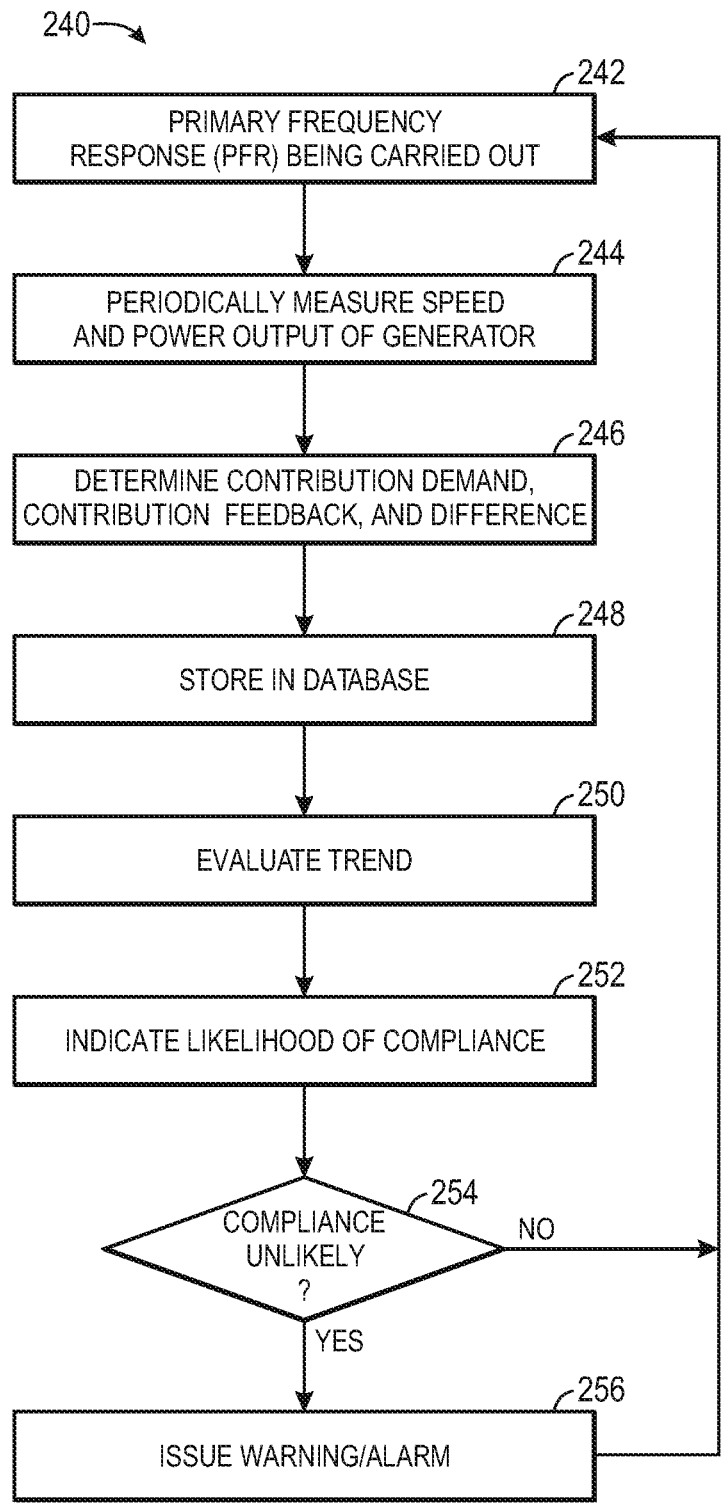
FIG. 6 is a flowchart of another embodiment of a specification compliance monitoring process during a primary frequency response (PFR) to a frequency disturbance.

As mentioned above, the compliance monitor 50 may insure that the power unit 18 remains in compliance with a grid rule or regulation while the power unit 18 responses to a frequency-based grid disturbance. FIGS. 5 and 6 describe embodiments of methods for performing such monitoring. In particular, a flowchart 210 of FIG. 5 describes a manner of periodically ascertaining compliance, beginning when the power unit 18 is carrying out a primary frequency response (PFR) (block 212). Thereafter, the compliance monitor 50 may perform a scan of the control system on a periodic basis (e.g., every 0.001 s, 0.002 s, 0.005 s, 0.01 s, 0.02, 0.05 s, 0.1 s, 0.2 s, 0.5 s, 1 s, 2 s, 5 s, or any other suitable period of time) to determine the speed of the generator 46, from which the frequency of the power output by the generator 46 may be determined, and the power output of the generator 46 (block 214). In some embodiments, the various control and monitoring components of the turbine generator controller 102 may perform such a scan and provide certain relevant information to the compliance monitor 50.

Via the periodic control system scans of block 214, the compliance monitor 50 may determine contribution demand (block 216) via Equation 1 or 2. The monitor also may determine the contribution feedback by ascertaining the current output power of the power unit 18 (block 218). From these values, the compliance monitor 50 may determine a difference between the contribution demand and the contribution feedback to ascertain an instantaneous feedback error (block 220). Such a feedback error may indicate whether the power unit 18 is performing the primary frequency response (PFR) in compliance with a specification (e.g., a power grid rule or regulation). Thus, based on the instantaneous feedback error, the compliance monitor 50 may consider whether the PFR carried out by the power unit 18 complies with the rule or regulation. As discussed below, the compliance monitor 50 may compare the contribution feedback and the contribution demand according to a variety of compliance tables or functions. These functions may be, for example, linear, non-linear, or discrete, based on the particular specification, final contribution demand, starting contribution feedback, and time. If the specification discussed above with reference to FIG. 4 is operative, the power unit 18 may not be operating in compliance with the specification when the instantaneous feedback error is less than half the difference between the starting contribution feedback and the final contribution demand.

If the compliance monitor 50 determines that the contribution feedback technically complies with the rule or regulation, or that the contribution feedback technically does not fail to comply (decision block 222), the monitor may next consider whether the contribution feedback almost fails to comply with the specification. The monitor may determine whether the feedback error is particularly close to failing to comply based on similar linear, non-linear, or discrete functions or tables. If the monitor determines that the contribution feedback is approaching non-compliance (decision block 224), the compliance monitor 50 may issue a warning (block 226) to alert operators of the power unit 18 or the utility grid system 40 that the power unit 18 could fail to comply with the rule or regulations. Such a warning may be provided via the utility signal 42 or be displayed on the human machine interface 112 of the turbine generator controller 102. In some embodiments, the compliance monitor 50 also may instruct the governor 48 to increase the rate of the primary frequency response (PFR). Regardless of whether the contribution feedback approaches non-compliance (decision block 224), the PFR may continue to take place (block 212).

If the compliance monitor 50 determines that the contribution feedback is not in compliance with the rule or regulation (decision block 222), the compliance monitor 50 may issue an alarm (block 228) that similarly alerts an operator of the power unit 18 or the utility grid system 40 that the power unit 18 is not carrying out the primary frequency response (PFR) in compliance with the specification. The alarm may include, among other things, flashing indicator lights, sirens, various voice alerts, or alerts displayed on a display of the human machine interface 112. The alarm may also be sent via the utility signal 42 to the utility grid system 40 to indicate the non-compliance of the power unit 18. In some embodiments, the compliance monitor 50 also may instruct the governor 48 to increase the rate of the PFR. After the compliance monitor 50 issues the alarm, the power unit 18 may continue to perform the PFR (block 212).

The compliance monitor 50 may also assess whether the power unit 18 complies with a specification (e.g., a power grid rule or regulation) by monitoring trends over time of the contribution feedback and the contribution demand. FIG. 6 illustrates a flowchart 240 describing an embodiment of such a method. The flowchart 240 may begin when the power unit 18 is caring out a primary frequency response (PFR) (block 242). Thereafter, the compliance monitor 50 may perform a scan of the control system on a periodic basis (e.g., every 0.001 s, 0.002 s, 0.005 s, 0.01 s, 0.02, 0.05 s, 0.1 s, 0.2 s, 0.5 s, 1 s, 2 s, 5 s, or any other suitable period of time) to determine the speed of the generator 46, from which the frequency of the power output by the generator 46 may be determined, and the power output of the generator 46 (block 244). In some embodiments, the various control and monitoring components of the turbine generator controller 102 may perform such a scan and provide certain relevant information to the compliance monitor 50. The monitor may further ascertain the contribution demand by applying Equation 1 or 2 and the contribution feedback by ascertaining the current output power of the power unit 18.

The contribution feedback and contribution demand may be stored in a database (block 248). The compliance monitor 50 may determine historical trends of such values (block 250), which may provide an indication of whether the difference between the contribution demand and the contribution feedback will be likely to comply with the specification (block 252). For example, the contribution feedback over a recent period of time may be increasing at a relatively low rate, making it unlikely that the contribution feedback will rise quickly enough to comply with the specification. If the compliance monitor 50 determines that the trends indicate that compliance is not unlikely (decision block 254), the compliance monitor 50 may not issue any warnings or alarms, and the power unit 18 may continue to perform the primary frequency response (PFR) (block 242). On the other hand, if the compliance monitor 50 determines that the trends indicate that compliance is unlikely (decision block 254), the compliance monitor 50 may certain warnings or alarms (block 256). Such warnings or alarms may include, among other things, flashing indicator lights, sirens, various voice alerts, or alerts displayed on a display of the human machine interface 112. The warning or alarm may also be sent via the utility signal 42 to the utility grid system 40 to indicate the non-compliance of the power unit 18. In some embodiments, the compliance monitor 50 also may instruct the governor 48 to increase the rate of the PFR. After the compliance monitor 50 issues the warning or alarm, the power unit 18 may continue to perform the PFR (block 242).

Figure 7:
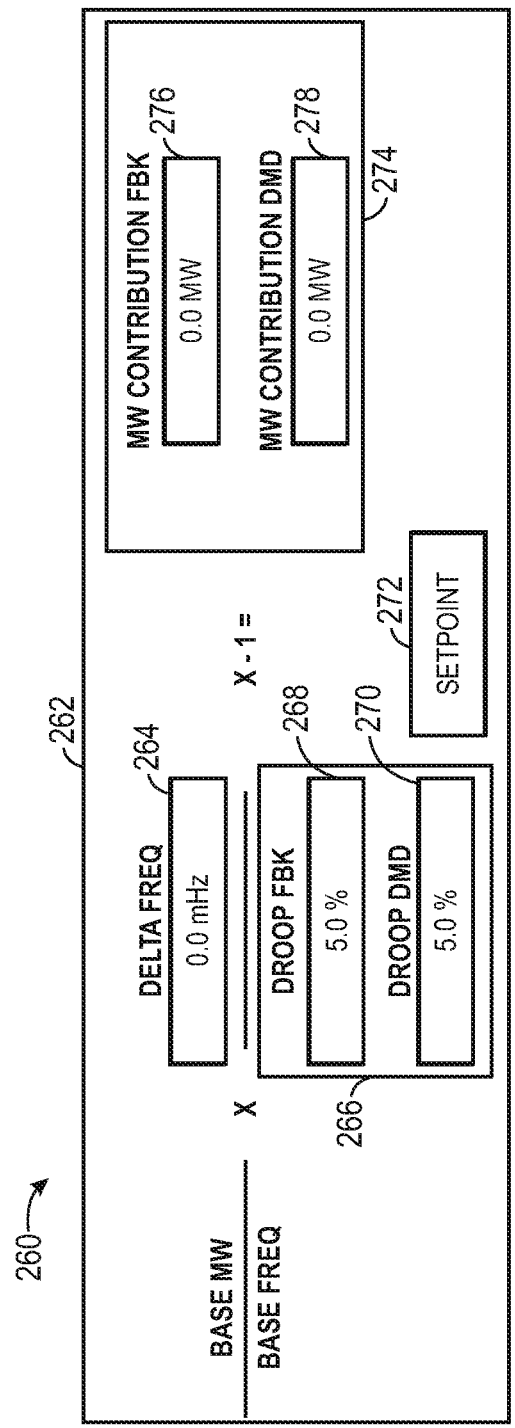
FIG. 7 is a schematic diagram of an embodiment of a human machine interface for a monitor.

The compliance monitor 50 may provide certain information for display on the human machine interface 112. One embodiment of such an interface appears as a compliance monitoring screen 260 of FIG. 7. The compliance monitoring screen 260 generally may indicate certain elements of Equations 1 or 2. For example, the compliance monitoring screen 260 may indicate certain base values 262, such as the nominal output power and the nominal output frequency of the power unit 18. For example, the compliance monitoring screen 260 may depict a current frequency disturbance 264 and certain operator-configurable droop response values 266. In particular, droop response values for droop feedback 268 and droop demand 270 may be changed by an operator of the power unit 18 by selecting a setpoint button 272. Primary frequency response (PFR) values 274, such as the contribution feedback 276 and contribution demand 278, may be displayed on the compliance monitoring screen 260 in real-time, as the PFR takes place.

Figure 8:
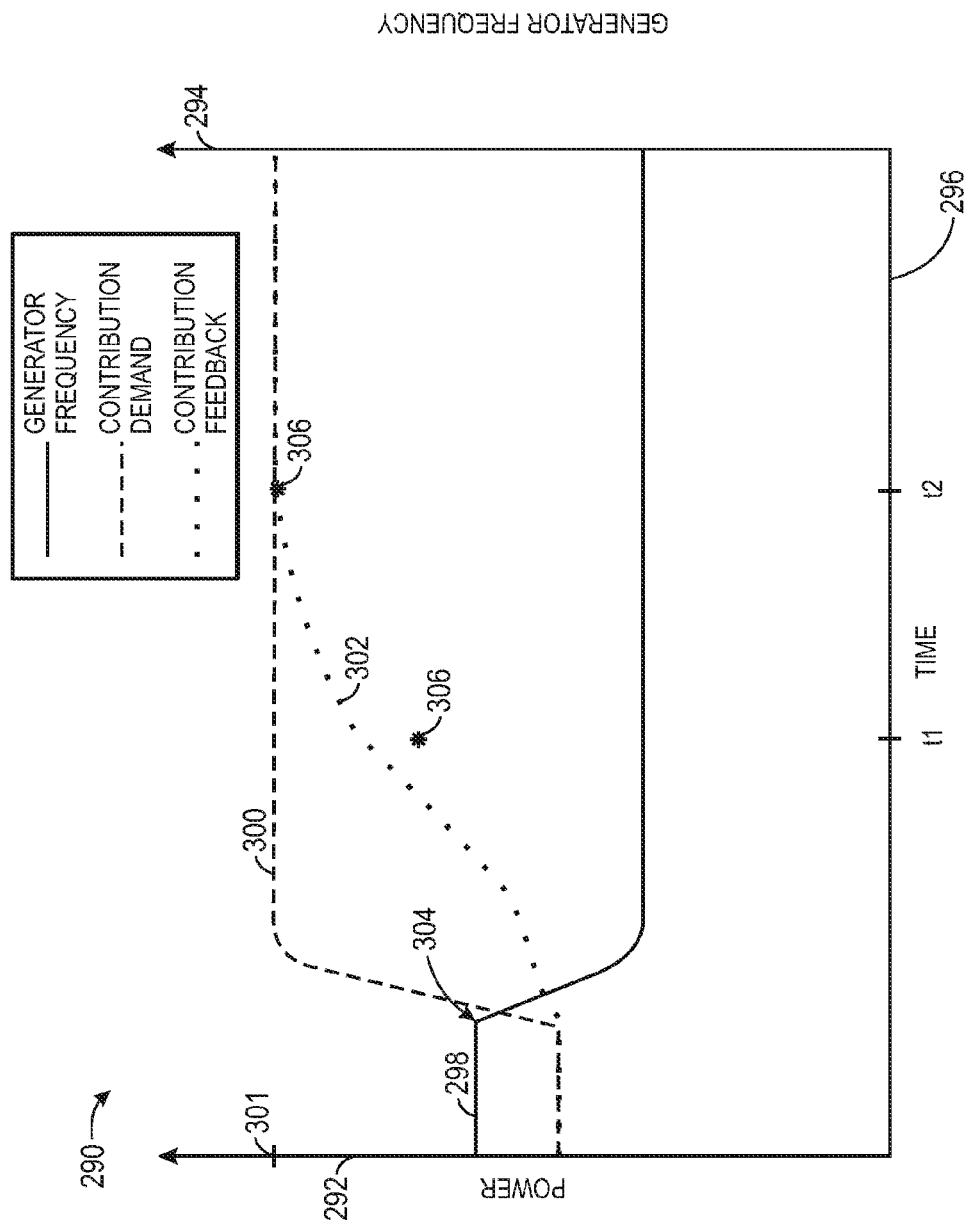
FIG. 8 is a plot illustrating another primary frequency response (PFR) of an electrical generator to a frequency disturbance on a power grid, in accordance with an embodiment.

FIGS. 8-11 represent embodiments of certain manners in which the compliance monitor 50 may determine whether the power unit 18 is carrying out a primary frequency response (PFR) in compliance with a specification. Turning first to FIG. 8, a plot 290 represents one manner in which the power unit 18 may carry out the PFR when the frequency disturbance is so great that the additional contribution demand exceeds the capabilities of the power unit 18. In particular, the plot 290 models power output by the power unit 18 (first ordinate 292), and the frequency of the power grid 12 and the power output by the power unit 18 (second ordinate 294), over time (abscissa 296). At the start of the plot 290, a curve 298, representing the frequency of the power unit 18, begins at a nominal frequency of the power grid 12. When a frequency-based grid disturbance 304 occurs, the frequency of the drive 44 may change rapidly, causing a corresponding change in the frequency of the output power.

As illustrated in the plot 290, the frequency changes dramatically. Indeed, according to Equation 1, if the additional contribution demand added to the original normal power output, the total contribution demand would exceed the nominal output power of the power unit 18. In such a situation, the governor 48 may lower the total contribution demand, depicted by a curve 300, to a maximum value depending on current environmental conditions rather than an impossible value. Thus, in the illustrated plot 290, the total contribution demand increases to the maximum value when the frequency disturbance 304 occurs.

As noted above, operators or owners of the utility grid system 40 may impose a specification as to how slowly the contribution feedback may meet the contribution demand. In the instant example, the specification may require that the contribution feedback exceed half of the additional contribution demand by a first time t1 after a frequency disturbance 304, and that the contribution feedback meet the additional contribution demand by a second time t2 after the frequency disturbance 304. As plainly apparent from the plot 290, the power unit 18 would fail to reach the originally calculated contribution feedback values in compliance with the specification. Thus, in these conditions, the compliance monitor 50 may instead determine compliance based on a contribution demand of the maximum power output, as noted by compliance indicators 306. In certain embodiments, even if compliance does not occur at the compliance indicator 306 at the first time t1, compliance may be deemed to have occurred if the compliance indicator 306 is met at the second time t2.

Figure 9:
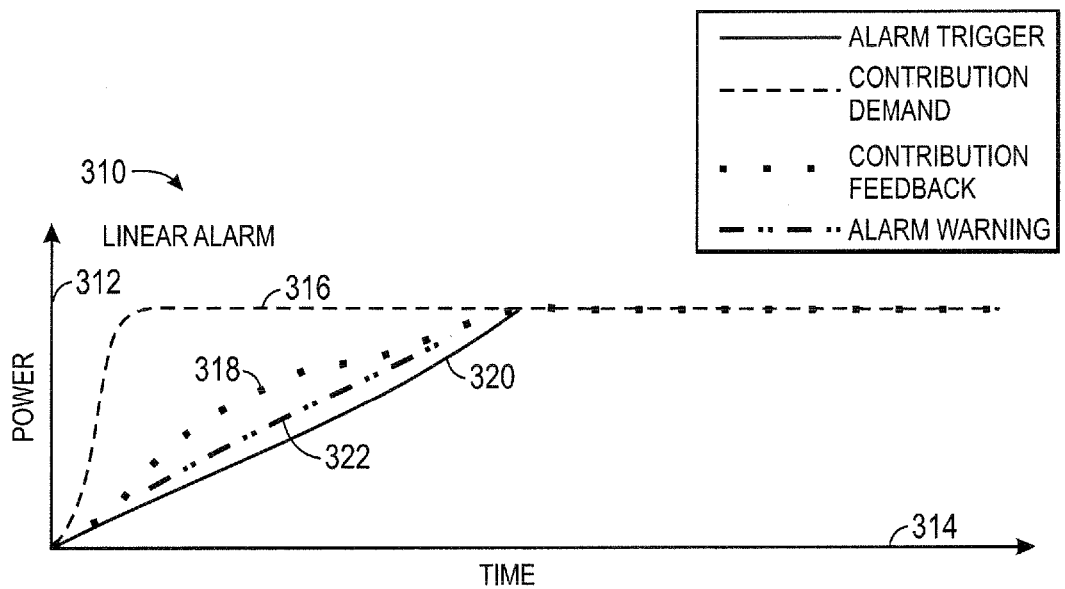
FIGS. 9-11 are plots modeling various embodiments of monitoring schemes for monitoring the compliance of an electrical generator during a primary frequency response (PFR) with a specification.
Figure 10:
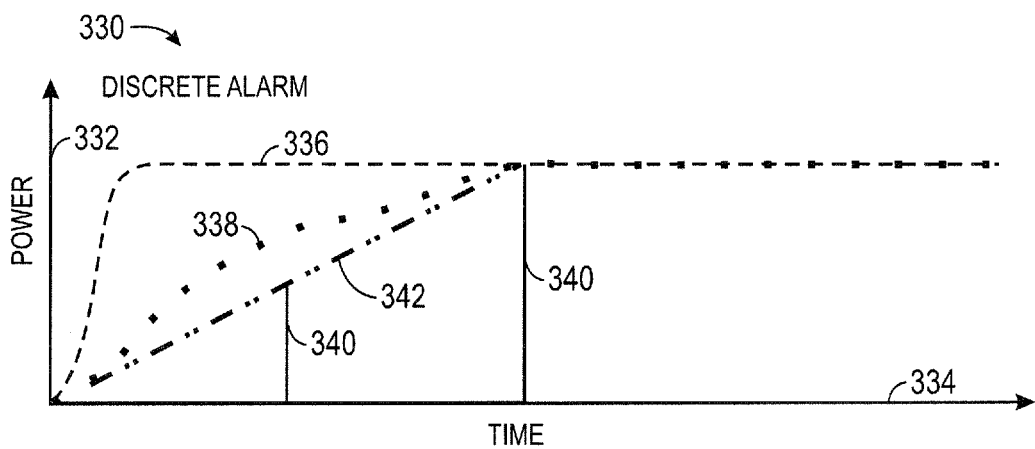

FIGS. 9-11 particularly illustrate certain alarm and warning functions that may define when the compliance monitor 50 determines that the power unit 18 is not in compliance with the specification. Although FIGS. 9-11 illustrate the case in which a frequency disturbance causes an output power frequency decrease, the disclosure associated with FIGS. 9-11 also may be employed for the case in which the frequency disturbance cases an output power frequency increase. As noted above, if the frequency disturbance involves an increase that crosses the dead band, the output from the compliance table may be multiplied by −1, and compliance may thus be monitored in the negative direction. In FIG. 9, a plot 310 represents a linear compliance function, illustrating power (ordinate 312) against time (abscissa 314) and beginning when a frequency disturbance occurs. A curve 316 models a contribution demand that results when the governor 48 initiates a primary frequency response (PFR), and a curve 318 models a contribution feedback as the power unit 18 increases its power output to meet the contribution demand. Curves 320 and 322 respectively represent triggers for an out of compliance alarm and a compliance warning alarm (e.g., near or approaching non-compliance). That is, if the contribution feedback curve 318 drops below the compliance warning alarm curve 322, the compliance monitor 50 may issue a warning. If the contribution feedback curve 318 drops below the compliance alarm curve 320, the compliance monitor 50 may issue a compliance warning alarm (e.g., near or approaching non-compliance).

In the plot 310 of FIG. 9, the curves 320 and 322 are linear functions that may be represented by a compliance table. For example, Table 1 below represents a linear compliance table, from which the curves 320 and 322 may be derived based on the starting contribution feedback and final contribution demand values.

TABLE 1

| Out of Compliance Alarm (Curve 320) | | Compliance Warning Alarm (Curve 322) | |
|---|---|---|---|
| Time(s) | Contribution (%) | Time(s) | Contribution (%) |
| 1 | 3.33 | 1 | 6.33 |
| 2 | 6.66 | 2 | 9.66 |
| 3 | 9.99 | 3 | 12.99 |
| 4 | 13.32 | 4 | 16.32 |
| 5 | 16.65 | 5 | 19.65 |
| 6 | 19.98 | 6 | 22.98 |
| 7 | 23.31 | 7 | 26.31 |
| 8 | 26.64 | 8 | 29.64 |
| 9 | 29.97 | 9 | 32.97 |
| 10 | 33.3 | 10 | 36.3 |
| 11 | 36.63 | 11 | 39.63 |
| 12 | 39.96 | 12 | 42.96 |
| 13 | 43.29 | 13 | 46.29 |
| 14 | 46.62 | 14 | 49.62 |
| 15 | 49.95 | 15 | 52.95 |
| 16 | 53.28 | 16 | 56.28 |
| 17 | 56.61 | 17 | 59.61 |
| 18 | 59.94 | 18 | 62.94 |
| 19 | 63.27 | 19 | 66.27 |
| 20 | 66.6 | 20 | 69.6 |
| 21 | 69.93 | 21 | 72.93 |
| 22 | 73.26 | 22 | 76.26 |
| 23 | 76.59 | 23 | 79.59 |
| 24 | 79.92 | 24 | 82.92 |
| 25 | 83.25 | 25 | 86.25 |
| 26 | 86.58 | 26 | 89.58 |
| 27 | 89.91 | 27 | 92.91 |
| 28 | 93.24 | 28 | 96.24 |
| 29 | 96.57 | 29 | 99.57 |
| 30 | 99.9 | 30 | 100 |

It should be appreciated that compliance tables need not end at 30 seconds, nor be tracked in one-second increments. For example, a 100-point table could be used, which may be programmed for any suitable time intervals or lengths (e.g., 100 points covering 10 seconds, or 100 points covering 10 minutes). Additionally, responses at times between defined points in compliance tables may be compared against interpolated values during every control scan.

Moreover, it should be appreciated that other tables may be developed based on any desired functions. For example, as illustrated by a plot 330 of FIG. 10, such a function may be discrete values at certain predetermined times. In FIG. 10, the plot 330 represents a discrete compliance function and a linear warning function, illustrating power (ordinate 332) against time (abscissa 334) and beginning when a frequency disturbance occurs. A curve 336 models a contribution demand that results when the governor 48 initiates a primary frequency response (PFR), and a curve 338 models a contribution feedback as the power unit 18 increases its power output to meet the contribution demand. Curves 340 and 342 respectively represent triggers for an out of compliance alarm and a compliance warning alarm (e.g., near or approaching non-compliance). That is, if the contribution feedback curve 338 drops below the compliance warning alarm curve 342, the compliance monitor 50 may issue a warning. If the contribution feedback curve 338 drops below the compliance alarm curve 340, the compliance monitor 50 may issue a compliance warning alarm (e.g., near or approaching non-compliance).

Similarly, as illustrated in FIG. 11, such compliance functions alternatively may be non-linear functions. For example, in FIG. 11, a plot 350 represents a non-linear compliance function and a parabolic warning function, illustrating power (ordinate 352) against time (abscissa 354) and beginning when a frequency disturbance occurs. A curve 356 models a contribution demand that results when the governor 48 initiates a primary frequency response (PFR), and a curve 358 models a contribution feedback as the power unit 18 increases its power output to meet the contribution demand. Curves 360 and 362 respectively represent triggers for an out of compliance alarm and a compliance warning alarm (e.g., near or approaching non-compliance). That is, if the contribution feedback curve 358 drops below the compliance warning alarm curve 362, the compliance monitor 50 may issue a warning. If the contribution feedback curve 358 drops below the compliance alarm curve 360, the compliance monitor 50 may issue a compliance warning alarm (e.g., near or approaching non-compliance).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a gas turbine configured to generate a torque;
an electrical generator coupled to the gas turbine, wherein the electrical generator is configured to provide power to a power grid based on the torque;
a controller coupled to the gas turbine, wherein the controller is configured to cause the gas turbine to vary the torque as a response to a frequency disturbance occurring on the power grid; and
a compliance monitor configured to determine whether the response to the frequency disturbance complies with a specification for the response by comparing the response to the frequency disturbance to a threshold function, wherein the threshold function comprises:
a linear curve; or
a non-linear curve; or
some combination thereof.

2. The system of claim 1, wherein the compliance monitor is configured to output a warning, an alarm, or a combination thereof, when the response to the frequency disturbance does not comply with the specification.

3. The system of claim 1, wherein the compliance monitor is configured to predict whether the response to the frequency disturbance is likely to comply with the specification in the future.

4. The system of claim 3, wherein the compliance monitor is configured to output a warning, an alarm, or a combination thereof, when the response to the frequency disturbance is unlikely to comply with the specification.

5. The system of claim 1, wherein the compliance monitor is configured to determine whether the response to the frequency disturbance complies with the specification as the controller performs the response to the frequency disturbance.

6. The system of claim 1, wherein the compliance monitor is configured to periodically determine whether the response to the frequency disturbance complies with the specification for an amount of time after the frequency disturbance occurs.

7. The system of claim 1, wherein the compliance monitor is configured to provide a signal to an operator associated with the power grid to indicate whether the response to the frequency disturbance complies with the specification.

8. The system of claim 1, wherein when the electrical generator carries out a primary frequency response in response to the frequency disturbance of the power grid, the compliance monitor is configured to compare a contribution feedback and a contribution demand to determine whether the primary frequency response of the electrical generator complies with the specification for the response of the electrical generator.

9. The system of claim 1, wherein the system is configured to initiate a primary frequency response of the electrical generator when the frequency disturbance occurs, the compliance monitor is configured to determine a contribution demand of the electrical generator based at least in part on a droop response of the electrical generator and an amount of the frequency disturbance, the compliance monitor is configured to obtain a measurement of an output of the electrical generator to determine a contribution feedback, the compliance monitor is configured to compare the contribution feedback to the contribution demand, and the compliance monitor is configured to indicate when the contribution feedback does not comply with the specification for a relationship between the contribution feedback and the contribution demand at a predetermined time.

10. A system comprising:
an electrical generator compliance monitor programmed to compare, when an electrical generator carries out a primary frequency response as a response to a frequency disturbance of a power grid, a contribution feedback and a contribution demand to determine whether the primary frequency response of the electrical generator complies with a specification for the response of the electrical generator, wherein the contribution demand is determined in accordance with the following relationship:

$$ContributionDMD = \frac{BaseMW}{BaseFREQ} \cdot \frac{DeltaFREQ}{DroopDMD} \cdot (-1)$$

wherein BaseMW represents a nominal power output of the system, BaseFREQ represents a nominal frequency of the system, DeltaFREQ represents a value of the frequency disturbance, and DroopDMD represents a droop response setpoint.

11. The system of claim 10, wherein the compliance monitor is programmed to determine that the primary frequency response does not comply with the specification when the contribution feedback is less than the contribution demand after a predetermined period of time and the electrical generator is capable of providing the contribution feedback.

12. The system of claim 10, wherein the compliance monitor is programmed to determine that the primary frequency response does not comply with the specification when the contribution feedback, after a predetermined period of time, is less than a predetermined fraction of a difference between the contribution demand and a starting contribution feedback, when the electrical generator is capable of providing the contribution feedback.

13. The system of claim 10, wherein the compliance monitor is programmed to determine that the primary frequency response does not comply with the specification when the contribution feedback is less than a minimum value defined by a linear function of at least the contribution demand and time.

14. The system of claim 10, wherein the compliance monitor is programmed to determine that the primary frequency response does not comply with the specification when the contribution feedback is less than a minimum value defined by a non-linear function of at least the contribution demand and time.

15. The system of claim 10, wherein the compliance monitor is programmed to predict whether the primary frequency response of the electrical generator is unlikely to comply with the specification based at least in part on a trend of the contribution feedback over time.

16. The system of claim 10, wherein the compliance monitor is programmed to determine whether the primary frequency response of the electrical generator is unlikely to comply with the specification based at least in part on whether the contribution feedback is less than a first minimum value defined by a warning function of the contribution demand and time but greater than a second minimum value defined by an alarm function of the contribution demand and time.

17. The system of claim 10, comprising a gas turbine coupled to the electrical generator.

18. A method comprising:
   initiating a primary frequency response of an electrical generator when a grid frequency disturbance occurs;
   determining a contribution demand of the electrical generator based at least in part on a droop response of the electrical generator and an amount of the frequency disturbance;
   measuring an output of the electrical generator to determine a contribution feedback;
   comparing the contribution feedback to the contribution demand; and
   indicating when the contribution feedback does not comply with a specification for a relationship between the contribution feedback and the contribution demand at a predetermined time;
   wherein the contribution demand is determined in accordance with the following relationship:

$$ContributionDMD = \frac{BaseMW}{BaseFREQ} \cdot \frac{DeltaFREQ}{DroopDMD} \cdot (-1)$$

wherein BaseMW represents a nominal power output of the system, BaseFREQ represents a nominal frequency of the system, DeltaFREQ represents a value of the frequency disturbance, and DroopDMD represents a droop response setpoint.

19. The method of claim 18, wherein the indication occurs when a difference between the contribution feedback and the contribution demand exceeds a threshold at the predetermined time.

20. The method of claim 18, wherein the indication occurs when the contribution feedback is predicted not likely to comply with the specification.

21. The method of claim 18, comprising determining whether the contribution feedback complies with the specification based at least in part on a table defining percent changes in the contribution feedback relative to the contribution demand over time.

22. A system comprising:
   a gas turbine configured to generate a torque;
   an electrical generator coupled to the gas turbine, wherein the electrical generator is configured to provide power to a power grid based on the torque;
   a controller coupled to the gas turbine, wherein the controller is configured to cause the gas turbine to vary the torque as a response to a frequency disturbance occurring on the power grid; and
   a compliance monitor configured to determine whether the response to the frequency disturbance complies with a specification for the response
   wherein the compliance monitor compares a contribution feedback to a contribution demand to determine whether the response to the frequency disturbance complies with a specification for the response, and wherein the contribution demand is determined in accordance with the following relationship:

$$ContributionDMD = \frac{BaseMW}{BaseFREQ} \cdot \frac{DeltaFREQ}{DroopDMD} \cdot (-1)$$

wherein BaseMW represents a nominal power output of the system, BaseFREQ represents a nominal frequency of the system, DeltaFREQ represents a value of the frequency disturbance, and DroopDMD represents a droop response setpoint.

* * * * *